(12) United States Patent
Lau

(10) Patent No.: US 7,963,023 B2
(45) Date of Patent: Jun. 21, 2011

(54) PROCESS FOR ACCURATELY MACHINING A MAGNETIC TAPE HEAD

(75) Inventor: Ritz Mingho Lau, Superior, CO (US)

(73) Assignee: Oracle America, Inc., Redwood City, CA (US)

( * ) Notice: Subject to any disclaimer, the term of this patent is extended or adjusted under 35 U.S.C. 154(b) by 639 days.

(21) Appl. No.: 11/941,340

(22) Filed: Nov. 16, 2007

(65) Prior Publication Data
US 2009/0128954 A1 May 21, 2009

(51) Int. Cl.
*G11B 5/29* (2006.01)
(52) U.S. Cl. ............ 29/603.09; 29/603.12; 29/603.13; 29/603.15; 29/603.16; 451/5; 360/122; 360/313
(58) Field of Classification Search ............ 29/603.07, 29/603.09, 603.12, 603.13, 603.15, 603.16, 29/603.17, 603.19, 603.27; 451/5; 360/122, 360/313

See application file for complete search history.

(56) References Cited

U.S. PATENT DOCUMENTS

| 3,821,815 | A | | 6/1974 | Abbott et al. |
| 4,670,732 | A | | 6/1987 | Church |
| 5,606,470 | A | * | 2/1997 | Shioya et al. ............. 360/313 X |
| 6,193,584 | B1 | * | 2/2001 | Rudy et al. ........................ 451/5 |
| 6,230,389 | B1 | * | 5/2001 | Zhu ........................ 29/603.12 X |
| 7,014,530 | B2 | | 3/2006 | Kasiraj et al. |
| 7,206,172 | B2 | | 4/2007 | Ding et al. |

FOREIGN PATENT DOCUMENTS
JP 08306005 A * 11/1996
* cited by examiner

*Primary Examiner* — A. Dexter Tugbang
(74) *Attorney, Agent, or Firm* — Brooks Kushman P.C.

(57) ABSTRACT

An electrical lapping guide for a magnetic tape head is provided with a resistive transverse stripe with a longitudinal height affixed to a substrate. A pair of leads extend from the stripe with a notch formed therebetween. The notch has a height corresponding to a lapping target limit for associated tape head elements. During material removal of the transverse stripe and the tape head elements, resistance is measured across the stripe and a dramatic increase in resistance indicates that the material removal has reached the notch. A method for accurately machining a magnetic tape head is provided by depositing tape head elements and a resistive stripe with a notch on a substrate. Resistance is measured across leads on either side of the notch for discontinuing machining of the stripe due to a dramatic increase in resistance.

6 Claims, 3 Drawing Sheets

PROCESS FOR ACCURATELY MACHINING A MAGNETIC TAPE HEAD

BACKGROUND OF THE INVENTION

1. Field of the Invention

The invention relates to an electrical lapping guide (ELG) for magnetic tape heads, and methods for making same.

2. Background Art

Magnetic tape heads typically include tape head elements formed from films that are deposited upon a substrate. The elements are machined to a desired height by a grinding process that is referred to as lapping. The desired height is referred to as a target stripe height for magnetic tape heads that have a magneto-resistive reader. The height is also referred to as a throat height for magnetic tape heads that are thin-film writers.

The prior art has utilized electrical lapping guides (ELG) to help define the target height of the tape head elements upon the substrate. Typically, one ELG is provided on each side of the tape head elements and is lapped with the tape head elements for measuring the target height of the tape head elements and for balance control across both lateral sides of the tape head elements. Since there is no real-time and cost-effective method for measuring the target height for a production tape head, and since both the ELG and reader are on the same layers of materials and share the same zero stripe height, the target height, or final stripe height (Ht), is usually calculated and obtained from a resistance feedback equation $Ro \times Ho = Rt \times Ht$, wherein Ro is an initial resistance at an initial stripe height Ho, and Rt is a measured target resistance at the final stripe height Ht.

SUMMARY OF THE INVENTION

One embodiment of the present invention provides an electrical lapping guide for a magnetic tape head having a resistive transverse stripe with a longitudinal height affixed to a substrate. A first lead extends from a first longitudinal side of the transverse stripe. A second lead extends from the first longitudinal side of the transverse stripe spaced apart from the first lead. A notch is formed in the first longitudinal side of the transverse stripe between the first and second leads. The notch has a height corresponding to a lapping target limit for associated tape head elements of the magnetic tape head so that during material removal of the transverse stripe and the tape head elements from a second longitudinal side of the transverse stripe, resistance is measured across the transverse stripe between the first and second leads, and a dramatic increase in resistance indicates that the material removal has reached the notch.

Another embodiment provides a pre-machined magnetic tape head having a substrate with a tape bearing surface. A plurality of tape head elements are affixed to the tape bearing surface. An electrical lapping guide is affixed to the substrate spaced transversely from the plurality of tape head elements. The electrical lapping guide includes a resistive transverse stripe with a longitudinal height affixed to a substrate. A first lead extends from a first longitudinal side of the transverse stripe. A second lead extends from the first longitudinal side of the transverse stripe spaced apart from the first lead. A notch is formed in the first longitudinal side of the transverse stripe between the first and second leads. The notch has a height corresponding to a lapping target limit for associated tape head elements of the magnetic tape head so that during material removal of the transverse stripe and the tape head elements from a second longitudinal side of the transverse stripe, resistance is measured across the transverse stripe between the first and second leads, and a dramatic increase in resistance indicates that the material removal has reached the notch.

Yet another embodiment of the invention discloses a method for accurately machining a magnetic tape head. A plurality of tape head elements are deposited on a substrate. A resistive transverse stripe is deposited on the substrate adjacent to the plurality of tape head elements with a height exceeding that of the plurality of tape head elements and a notch with a height corresponding to a target height limit of the plurality of tape head elements. A first lead is connected to the transverse stripe. A second lead is connected to the transverse stripe spaced apart from the first lead with a notch in between the first and second leads. Resistance of the transverse stripe from the first and second leads is measured. The transverse stripe and the plurality of tape head elements are machined by removing material from the height of the transverse stripe and the plurality of tape head elements. The machining is discontinued upon a dramatic increase in the resistance of the transverse stripe.

Another embodiment discloses a pre-machined magnetic tape head processed by a method that provides a substrate with a tape bearing surface. A plurality of tape head elements are deposited on the tape bearing surface. A resistance transverse stripe is deposited on the substrate adjacent to the plurality of tape head elements with a height exceeding that of the plurality of tape head elements and a notch with a height corresponding to a target height limit of the plurality of tape head elements. A first lead is connected to the transverse stripe. A second lead is connected to the transverse stripe spaced apart from the first lead with the notch in between the first and second leads so that resistance of the transverse stripe can be measured from the first and second leads while the transverse stripe and the plurality of tape head elements are machined for discontinuing the machining upon a dramatic increase in the resistance of the transverse stripe.

The above embodiments, and other embodiments, features, advantages, and benefits of the present invention are readily apparent from the detailed description of embodiments of the present invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Figure 1:
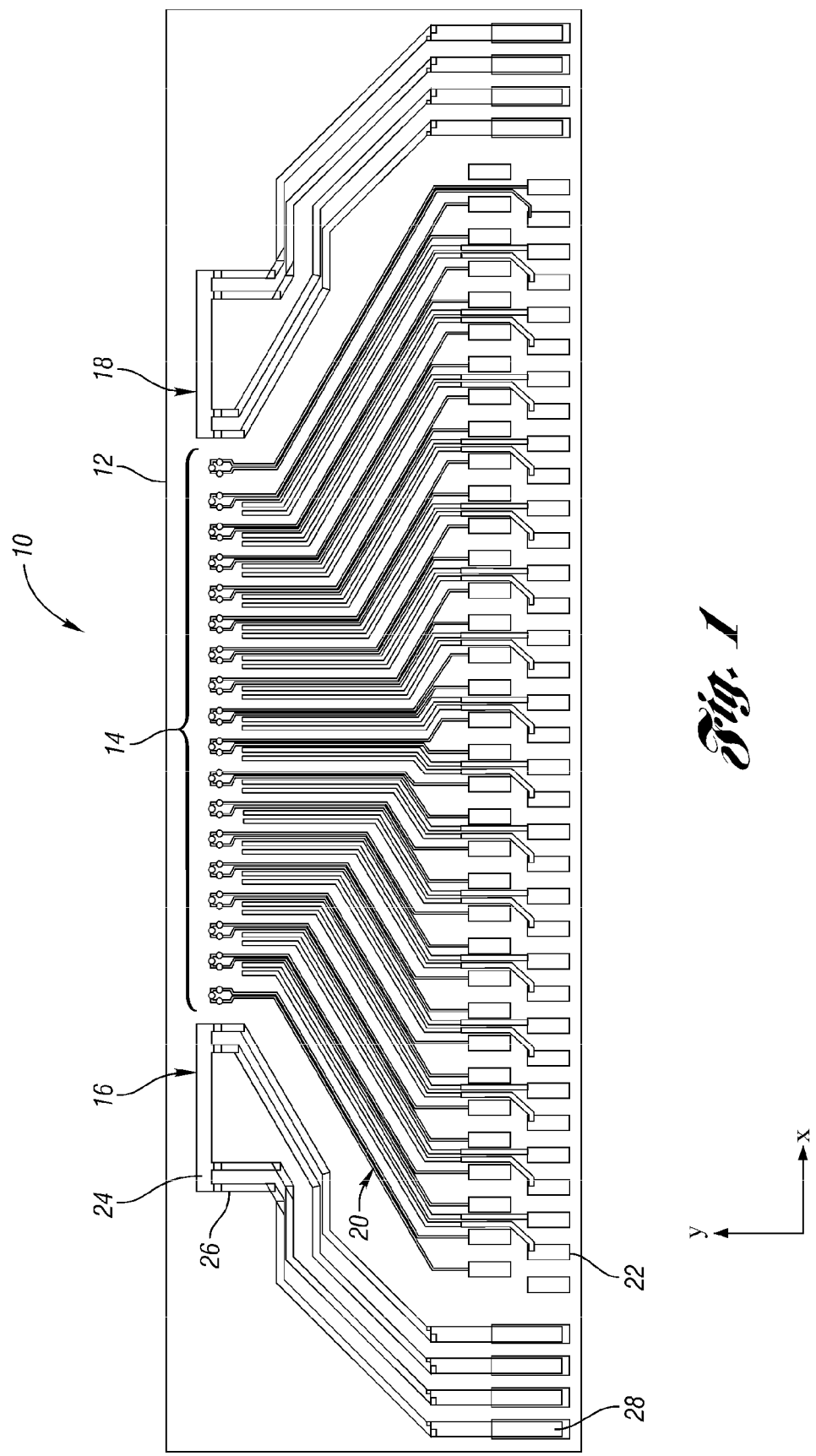
FIG. 1 is an illustration of a substrate for a magnetic tape head, having a plurality of tape head elements and a pair of electrical lapping guides, in accordance with an embodiment of the present invention.

Referring now to FIG. 1, a magnetic tape head 10 is illustrated in accordance with an embodiment of the present invention. The magnetic tape head 10 includes a substrate 12 for supporting a plurality of tape head elements 14 and a pair of electrical lapping guides 16, 18.

The tape head elements 14 are each deposited as multiple films of various magnetic materials. The tape head elements 14 are deposited oversized in a height direction, illustrated as a Y axis in FIG. 1, to facilitate subsequent machining to the desired limits. Specifically, the tape head elements 14 are subsequently ground to a final stripe height, which is referred to as a target stripe height when the tape head 10 is a magneto-resistive reader; and the final stripe height is referred to as a throat height when the tape head 10 is a thin-film writer.

A plurality of conductive leads 20 are provided on the substrate 12, each in electrical connection with one of the tape head elements 14. The conductive leads 20 diverge in a transverse direction (axis X in FIG. 1) as they extend longitudinally from the tape head elements 14. The conductive leads 20 diverge to provide an area for a plurality of bonding pads 22 disposed on the substrate 12. The bonding pads 22 are electrically connected to each of the associated conductive leads 20 for attachment of flexible cables to the magnetic tape head. All of the active devices of the magnetic tape head 10, including readers, writers, and servo-readers, are provided by the tape head elements 14, which are wired into electrical communication with the associated tape drive via the bonding pads 22. Once machined, a tape bearing surface is provided across the tape head elements 14 for translation of a media tape across the magnetic tape head 10.

Reliability problems may be created if the wire bonding pads 22 are used for contour processing of the tape head elements 14, and then subsequently reused for flexible cable attachment for the active devices of the final magnetic tape head 10. For example, if the current characteristics are measured across the tape head elements 14 by connection of a measurement device to the wire bonding pads 22 during the grinding of the tape head elements 14, the reliability of the wire bonding pads 22 may be reduced if subsequently used for connecting flexible cables for the associated tape drive.

Accordingly, in order to maintain the reliability of the wire bonding pads 22, a pair of electrical lapping guides 16, 18 are provided for contour processing and defining of a stripe height of the tape head elements 14. The electrical lapping guides 16, 18 are utilized only during the manufacture of the tape head 10 and are not subsequently utilized during the operation of the tape head 10. A pair of electrical lapping guides 16, 18 are utilized on either side of the tape head elements 14 for alignment and balancing across the tape head elements 14 and for accurate machining of the tape head elements 14. Each of the ELGs 16, 18 include a transverse stripe 24 that is machined with the tape head elements 14 during the lapping process for material removal from the transverse stripes 24 and the tape head elements 14. A plurality of leads 26 are connected to the transverse stripe 24 and are formed of a conductive material that extends longitudinally along the substrate 12. The leads 26 diverge as they extend from the transverse stripes 24 and are each connected to a wire bonding pad 28 for connection of a measurement device during the lapping operation.

Figure 2:
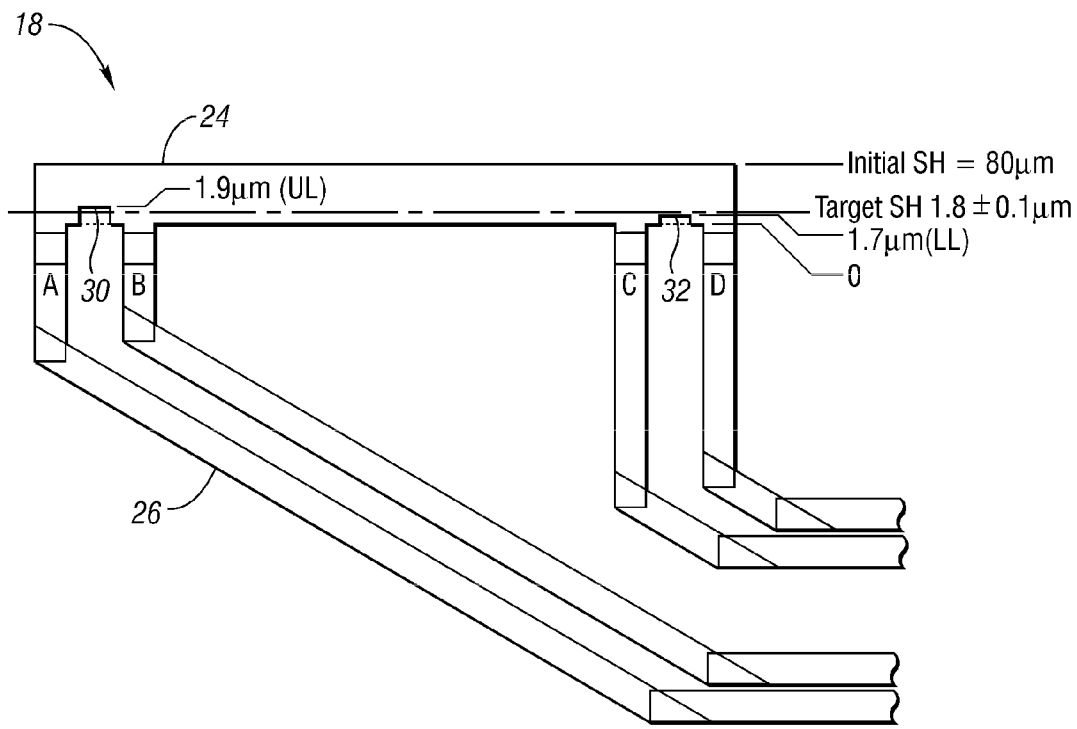
FIG. 2 is an enlarged view of a portion of an electrical lapping guide of FIG. 1.

Referring now to FIG. 2, one of the electrical lapping guides 18 is illustrated enlarged for further detail. Additionally, the four leads 26 are labeled A to D. The transverse stripe 24 is formed from a resistive material having a longitudinal stripe height in the Y axis. A stripe height of zero is labeled in FIG. 2, which corresponds to a zero stripe height for the tape head elements 14. The stripe 24 also includes an initial stripe height, which in one embodiment has a height greater than the tape head elements 14, which may be eighty micrometers (μm).

During the lapping operation, the transverse stripes 24 of the ELGs 16, 18 and the tape head elements 14 are ground from a side of the longitudinal height opposite the leads 20, 26. In order to measure the resulting height of the stripes 24 and the tape head elements 14, the resistance is measured across the stripes 24. As illustrated in FIG. 2, the resistance is measured across leads A and B, leads C and D, and leads B and C. In one embodiment, lead A extends from a first end of the transverse stripe 24, and lead D extends from another end of the transverse stripe 24. Leads B and C are provided between leads A and D. Lead B is provided adjacent to the lead A, and lead C is provided adjacent to lead D to provide a large intermediate region of the transverse stripe 24 between B and C for measuring resistance across the transverse stripe 24. Since the stripes 24 are formed of a resistive material, the resistance increases as material is removed.

Figure 3:
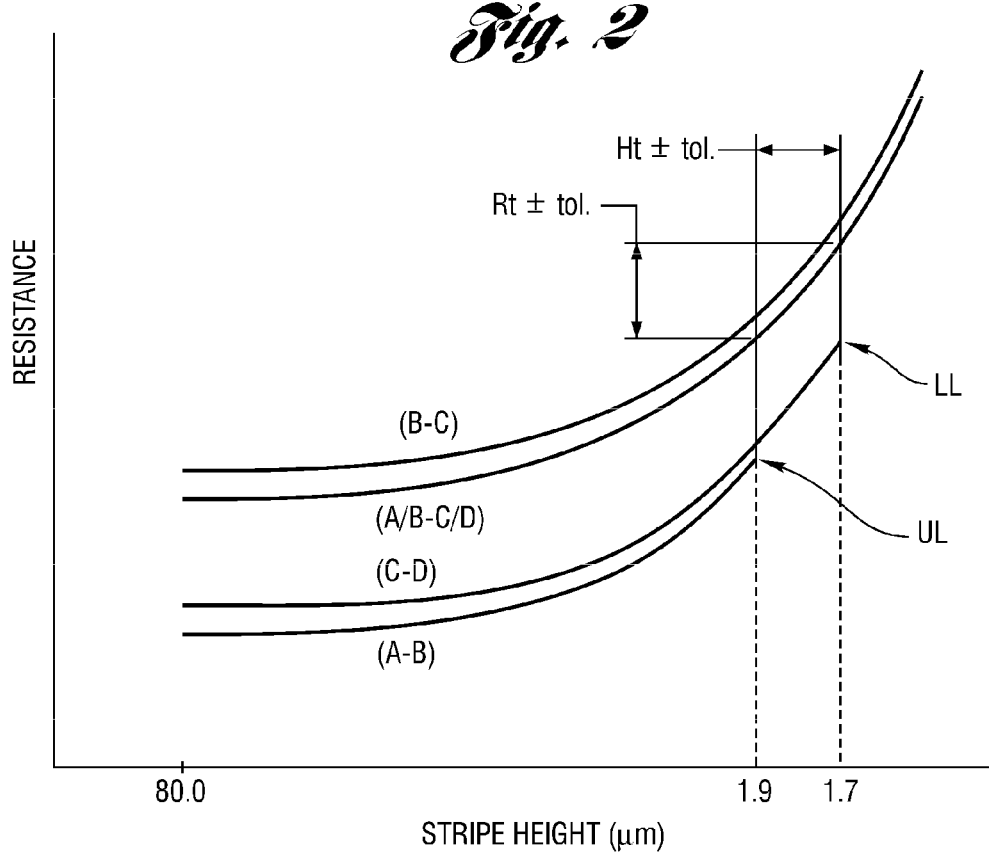
FIG. 3 is a graph of resistance versus electrical lapping guide stripe height for the electrical lapping guides of FIG. 1, and for a prior art electrical lapping guide.

Referring now to FIG. 3, a graph of resistance versus stripe height is illustrated, with stripe height as the abscissa and resistance as the ordinate, with the use of constant current in general. Line (A/B-C/D) illustrates how the resistance from leads A-B to leads C-D of the transverse stripe 24 increases as the stripe height is reduced. Under the prior art method of lapping the guides 16, 18 and the tape head elements 14, the resistance is measured from leads A-B to leads C-D. The resistance feedback equation, Ro×Ho=Rt×Ht, is utilized for determining the target stripe height Ht. Specifically, a target stripe height range is identified for the stripe height Ht, which is labeled Ht±tolerance in FIG. 3. By using the resistance feedback equation, a range for Rt is derived by multiplying Ro and Ho and dividing Ht for each limit in the target stripe height range. The range for Rt is depicted in FIG. 3 as Rt±the tolerance. Accordingly, under the prior art lapping technique, the resistance from A-B to C-D was measured during the lapping, and upon the resistance falling within the range of Rt±the tolerance for both ELGs, the lapping was discontinued, thereby obtaining a target stripe height within the tolerance.

The prior art lapping technique that utilizes the resistance feedback equation is sufficiently accurate for defining a target stripe height Ht with a wider tolerance range, 0.2 μm for example. The transverse stripes 24 are formed from the same material as the tape head elements 14, which is a typical magneto-resistive material formed of multiple layers of sputtering material. Accordingly, a bulk property, such as electrical resistivity of the transverse stripes 24 is not completely homogenous. Due to this characteristic of the materials, the lapping process utilizing the resistance feedback equation is only accurate for mechanical tolerance ranges of ±0.2 μm. However, smaller tolerances, such as a tolerance of ±0.1 μm, for example, could be utilized for an advanced tape head, such as the tape head 10, with narrower reader track width and a smaller stripe height with tighter control. A narrower reader track width permits more tracks per tape width and therefore more media storage upon a storage device. Additionally, narrower track widths result in greater accuracy of reading and writing data to a storage device, thereby resulting in reduced failures and reduced loss of data. The prior art lapping process with the resistance feedback equation can be utilized for machining tape head elements 14 to a smaller target range.

However, since such accuracy is outside the limitations of the materials, the stripe height of the tape head elements 14 must be measured after manufacturing by a scanning electron microscope after pole dissection. These methods are extremely time-consuming and may result in large quantities of scrapped machined substrates, thereby increasing scrap costs.

Referring again to FIG. 2, the transverse stripe 24 of the electrical lapping guide 16 is provided with a first notch 30 and a second notch 32. The widths of the notches 30, 32 are illustrated exaggerated in FIG. 2; the invention contemplates any width of the notches 30, 32. The notches 30, 32 are utilized for identifying a tolerance range for the associated tape head elements 14. The mechanical positioning of the notches 30, 32 can be deposited with a very high accuracy range, which is more accurate than that predicted by the resistance feedback equation.

In one embodiment, a target stripe height for the tape head elements 14 is 1.8 μm±0.1 μm. Therefore, an upper end of the tolerance range is 1.9 μm, and a lower limit to the tolerance range is 1.7 μm. Therefore, the first notch 30 is provided to a height of 1.9 μm and the second notch 32 is provided to a height of 1.7 μm. By measuring the resistance across leads A and B, while machining the transverse stripes 24 and the tape head elements 14, a dramatic increase of resistance across leads A and B indicates that the lapping has intersected notch 30 and that the stripe height is within the targeted range. Further machining of the transverse stripes 24 and the tape head elements 14 can intersect the second notch 32. If the machining intersects the second notch 32, which would result in a dramatic increase in resistance across leads C and D, this dramatic increase in resistance indicates that the stripe height is now outside the target range and therefore the magnetic tape head 10 is not within tolerance. Additionally, the resistance can be measured across leads B and C to utilize the resistance feedback equation for predicting the target stripe height range and for machining towards that targeted range, whereby the range is confirmed by the dramatic increase in resistance measured between leads A and B.

Referring again to FIG. 3, line (B-C) indicates an increase in resistance as a function of decrease in stripe height. Similar to the prior art method, the resistance feedback equation can be calculated for the targeted range of stripe heights for determining the targeted range of resistance. The targeted range of resistance is confirmed by the monitoring of the resistance across leads A and B. The resistance across leads A and B is indicated by the line (A-B). As indicated by the line (A-B), the resistance increases as a function of the reduction in stripe height. Once the stripe height reaches the upper limit (UL) within the range, the resistance jumps up to infinite. Thus, the resistance across A-B provides a digital indication to the lapping device that the grinding of the transverse stripes 24 and the tape head elements 14 is within the target stripe height range. Accordingly, once the resistance across leads A to B for both ELGs has been reached, the lapping operation, or grinding of the lapping guides 16, 18 and tape head elements 14, is discontinued. The resistance across leads C-D is also measured and is illustrated by line (C-D). This graph shows that the resistance increases until reaching the lower limit of the target stripe height range, whereby the resistance jumps up to infinite. Thus, a digital reading of the resistance C-D indicates that the material removal has exceeded the target stripe height range and therefore the magnetic tape head 10 is out of tolerance.

Figure 4:
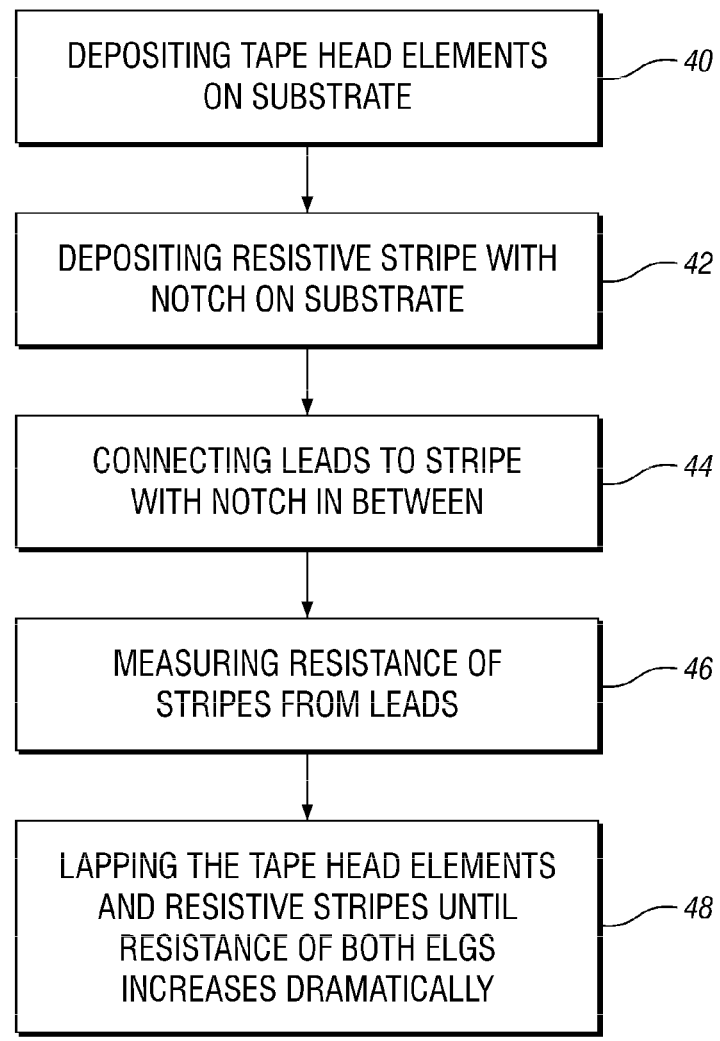
FIG. 4 is a flow chart for a method for accurately machining a magnetic tape head in accordance with another embodiment of the present invention.

Referring now to FIG. 4, a method for accurately machining a magnetic tape head is illustrated by a flow chart. In block 40, tape head elements are deposited on a substrate. In block 42, the resistive stripes are deposited with a notch on the substrate. In block 44, leads are connected to the stripe with the notch in between the leads. In block 46, resistance is measured across the stripe from the leads. In block 48, lapping is performed of the tape head elements and the resistive stripe until the resistance increases dramatically. Once the resistance increases dramatically for both ELGs, the lapping operation is discontinued and the stripe height is thereby machined to the height of the notch.

Although a dual notch configuration is illustrated and described, the invention contemplates utilization of one notch for indicating a threshold to the desired stripe height range. Of course, the pair of notches are utilized for confirming that the lapping has fallen within the targeted range. Although the measurement of resistance across the intermediate leads, leads B and C, is illustrated and described for predicting the targeted stripe height range, the invention contemplates machining the tape head elements 14 without the prediction.

Although a pair of electrical lapping guides 16, 18 are illustrated and described for redundant measurement and for alignment across the tape head elements 14, the invention contemplates any number of electrical lapping guides 16, 18, such as one or more electrical lapping guides 16, 18.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for accurately machining a magnetic tape head comprising:
    depositing a plurality of tape head elements on a substrate;
    depositing a resistive transverse stripe on the substrate adjacent to the plurality of tape head elements with a height exceeding that of the plurality of tape head elements and a notch with a height corresponding to a target height limit of the plurality of tape head elements;
    connecting a first lead to the resistive transverse stripe;
    connecting a second lead to the resistive transverse stripe spaced apart from the first lead with the notch in between the first and second leads;
    measuring resistance of the resistive transverse stripe from the first and second leads;
    machining the resistive transverse stripe and the plurality of tape head elements by removing material from the height of the resistive transverse stripe and the plurality of tape head elements; and
    discontinuing the machining upon a dramatic increase in the resistance of the resistive transverse stripe indicating that the machining has reached the notch.

2. The method of claim 1 wherein the notch is further defined as a first notch, the method further comprising:
    depositing the resistive transverse stripe with a second notch with a height corresponding to another target height limit of the plurality of tape head elements, which is less than the height of the first notch, the second notch being spaced apart from the first notch with the second lead therebetween;
    connecting a third lead to the resistive transverse stripe between the second lead and the second notch;
    connecting a fourth lead to the resistive transverse stripe spaced apart from the third lead with the second notch therebetween; and
    measuring resistance of the resistive transverse stripe from the third and fourth leads to ensure that the machining is discontinued prior to a dramatic increase in resistance from the third and fourth leads.

3. The method of claim 2 further comprising:

measuring resistance of the resistive transverse stripe from the second and third leads to determine an initial resistance;

predicting a target resistance range for the plurality of tape head elements from a resistance feedback equation of the initial resistance times an initial stripe height divided by a target stripe height for upper and lower limits of a target stripe height range;

measuring resistance of the resistive transverse stripe from the second and third leads during machining to determine when the stripe height is approaching the predicted target stripe height range.

4. The method of claim 1 wherein the resistive transverse stripe is further defined as a first resistive transverse stripe, the method further comprising:

depositing a second resistive transverse stripe on the substrate spaced apart from the first resistive transverse stripe with the plurality of tape head elements therebetween, with a height exceeding that of the plurality of tape head elements and a notch with a height corresponding to the target height limit of the plurality of tape head elements;

connecting a first lead to the second resistive transverse stripe;

connecting a second lead to the second resistive transverse stripe spaced apart from the first lead with the notch in between the first and second leads;

measuring resistance of the second resistive transverse stripe from the first and second leads;

machining the first resistive transverse stripe, the plurality of tape head elements, and the second resistive transverse stripe by removing material from the height of the first resistive transverse stripe, the plurality of tape head elements, and the second resistive transverse stripe; and discontinuing the machining after a dramatic increase in the resistance of the first resistive transverse stripe and a dramatic increase in resistance of the second resistive transverse stripe indicating that the machining has reached the notches in the first and second resistive transverse stripes.

5. The method of claim 4 wherein the notch in the first resistive transverse stripe is further defined as a first notch in the first resistive transverse stripe and the notch in the second resistive transverse stripe is further defined as a first notch in the second resistive transverse stripe, the method further comprising:

depositing the first resistive transverse stripe with a second notch with a height corresponding to a second target height limit of the plurality of tape head elements, which is less than the height of the first notch of the first resistive transverse stripe, the second notch of the first resistive transverse stripe being spaced apart from the first notch of the first resistive transverse stripe with the second lead of the first resistive transverse stripe therebetween;

connecting a third lead to the first resistive transverse stripe between the second lead of the first resistive transverse stripe and the second notch of the first resistive transverse stripe;

connecting a fourth lead to the first resistive transverse stripe spaced apart from the third lead of the first resistive transverse stripe with the second notch of the first resistive transverse stripe therebetween;

depositing the second resistive transverse stripe with a second notch with a height corresponding to the second target height limit of the plurality of tape head elements, the second notch of the second resistive transverse stripe being spaced apart from the first notch of the second resistive transverse stripe with the second lead of the second resistive transverse stripe therebetween;

connecting a third lead to the second resistive transverse stripe between the second lead of the second resistive transverse stripe and the second notch of the second resistive transverse stripe;

connecting a fourth lead to the second resistive transverse stripe spaced apart from the third lead of the second resistive transverse stripe with the second notch of the second resistive transverse stripe therebetween; and measuring resistance of the first resistive transverse stripe from the third and fourth leads of the first resistive transverse stripe, and measuring resistance of the second resistive transverse stripe from the third and fourth leads of the second resistive transverse stripe to ensure that the machining is discontinued prior to a dramatic increase in resistance from the third and fourth leads of the first resistive transverse stripe or the third and fourth leads of the second resistive transverse stripe.

6. The method of claim 5 further comprising measuring resistance of the first resistive transverse stripe from the second and third leads and measuring resistance of the second resistive transverse stripe from the second and third leads to ensure that the machining is discontinued prior to a dramatic increase in resistance from the second and third leads of the first resistive transverse stripe or from the second and third leads of the second resistive transverse stripe.

\* \* \* \* \*